United States Patent
Kidani

(10) Patent No.: US 7,746,494 B2
(45) Date of Patent: Jun. 29, 2010

(54) DATA PROCESSING APPARATUS, DATA PROCESSING METHOD, PRINTER DRIVER, PRINT CONTROL APPARATUS, PRINT CONTROL METHOD, AND PRINTING SYSTEM

(75) Inventor: Hideyuki Kidani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1184 days.

(21) Appl. No.: 11/086,930

(22) Filed: Mar. 22, 2005

(65) Prior Publication Data

US 2005/0219595 A1  Oct. 6, 2005

(30) Foreign Application Priority Data

Mar. 31, 2004  (JP)  ............................. 2004-104377
Jan. 17, 2005  (JP)  ............................. 2005-008592

(51) Int. Cl.
   *G06K 15/00*  (2006.01)
(52) U.S. Cl. ...................... 358/1.15; 358/1.1; 358/1.13; 358/1.16; 358/1.17; 358/1.18
(58) Field of Classification Search ................ 358/1.13, 358/1.14, 1.15, 1.16, 1.17, 1.18
See application file for complete search history.

(56) References Cited

U.S. PATENT DOCUMENTS

| | | | |
|---|---|---|---|
| 5,594,860 A * | 1/1997 | Gauthier | 345/543 |
| 6,124,943 A | 9/2000 | Mitani | |
| 6,538,764 B2 * | 3/2003 | Ueda | 358/1.16 |
| 6,665,081 B1 * | 12/2003 | Suzuki et al. | 358/1.13 |
| 6,796,730 B2 * | 9/2004 | Toda et al. | 400/76 |
| 7,229,224 B2 * | 6/2007 | Toda et al. | 400/76 |
| 7,268,912 B2 * | 9/2007 | Murata | 358/1.5 |
| 7,535,589 B2 * | 5/2009 | Toda | 358/1.15 |
| 2003/0133141 A1 * | 7/2003 | Toda et al. | 358/1.13 |
| 2004/0036894 A1 * | 2/2004 | Murata | 358/1.5 |
| 2004/0252339 A1 * | 12/2004 | Toda | 358/1.16 |
| 2005/0213130 A1 * | 9/2005 | Bender et al. | 358/1.13 |

* cited by examiner

Primary Examiner—Twyler L Haskins
Assistant Examiner—Kent Yip
(74) Attorney, Agent, or Firm—Canon U.S.A., Inc. I.P. Division

(57) ABSTRACT

In a printing system, intermediate data in a rendering-standby state can be rendered before intermediate data of an entire page is accumulated in a printing apparatus. A printer driver of a host computer sequentially converts a plurality of rendered objects of each page generated by an application to rendering commands of each page which can be interpreted by the printing apparatus. Every time a rendered object that should be rendered last in each of a plurality of bands, which are defined by dividing a page by the printing apparatus, is detected, the printer driver converts the rendered object that should be rendered last to a rendering command and notifies the printing apparatus of end information indicating the end of processing of the corresponding band.

4 Claims, 14 Drawing Sheets

FIG. 13

| STORAGE MEDIUM SUCH AS FD OR CD-ROM |
|---|
| DIRECTORY INFORMATION |
| FIRST DATA PROCESSING PROGRAM PROGRAM CODE GROUP CORRESPONDING TO STEPS OF FLOWCHART SHOWN IN FIG. 7 |
| SECOND DATA PROCESSING PROGRAM PROGRAM CODE GROUP CORRESPONDING TO STEPS OF FLOWCHART SHOWN IN FIG. 8 |
| THIRD DATA PROCESSING PROGRAM PROGRAM CODE GROUP CORRESPONDING TO STEPS OF FLOWCHART SHOWN IN FIG. 10 |
| |

DATA PROCESSING APPARATUS, DATA PROCESSING METHOD, PRINTER DRIVER, PRINT CONTROL APPARATUS, PRINT CONTROL METHOD, AND PRINTING SYSTEM

BACKGROUND OF THE INVENTION

1. Field of the Invention

The present invention relates to a printing system for performing rendering by transmitting rendering data in units of pages from a printer driver of a host computer to a printer and by converting the rendering data to intermediate data in units of bands in the printer.

2. Description of the Related Art

In this type of printing system, a printer driver installed in a storage device of a data processing apparatus converts rendering data generated by an application to rendering data which can be interpreted by a printer and transmits the converted rendering data to the printer upon receiving a print request. In this case, the rendering data transmitted from the printer driver to the printer is called PDL (page description language) data, which is described in units of pages.

The printer converts the rendering data of each page into intermediate data in units of bands. After generating intermediate data of one page, the printer renders the intermediate data in order from the top band so as to generate image data, and compresses and holds the image data. After the data of all bands, that is, the data of one page, has been rendered and compressed, the compressed image data is decompressed in synchronization with a printing process, so that print image data is created.

The main reason of rendering and compressing the data in units of bands is that very large sequential memory is required for holding uncompressed image data of an entire page.

In a printer, three processes executed in a printer controller: a process of generating intermediate data; a process of rendering and compressing the data; and a process of decompressing and printing the data, are generally performed in parallel. Accordingly, data of a plurality of pages is accumulated in respective memory areas for the intermediate data and the compressed image data.

When such a system is applied to a general electrophotographic apparatus, such as a laser beam printer (LBP), copying for making copies of each page or reprinting (recovery) after paper jam is performed by using compressed image data, so that the compressed image data is held until the corresponding page has been printed. However, intermediate data is released in units of bands after being rendered (for example, see Japanese Patent Laid-Open No. 10-147017).

Generally, rendered full-color image data is converted to C, M, Y, and K planes, halftone processing is performed thereon in accordance with the tone of the electrophotographic apparatus, and then the image data is compressed. Accordingly, the compression rate of the image data increases, so that the image data can be efficiently decompressed at printing.

A system of starting printing after rendering all bands of a page is suitable for a full-color electrophotographic apparatus of a tandem system including four developing mechanisms for CMYK and a high-speed monochrome electrophotographic apparatus.

In a medium/low-speed monochrome electrophotographic apparatus or a non-tandem full-color electrophotographic apparatus having only one developing mechanism, a method of performing rendering in synchronization with a printing process has been traditionally used.

Japanese Patent Laid-Open No. 2003-216361 discloses another printing system in which a printer driver installed in a host computer spools rendering commands of one page from an application and sorts the rendering commands in units of bands according to the printing start direction of a printer. Accordingly, rendering data is generated not in units of pages but in units of bands, and the rendering data is transmitted to the printer.

In this system, the printer can render a band of rendering data upon receiving it from the host computer. Further, intermediate data of the band is released after being rendered. Therefore, a memory for intermediate data is less likely to be cluttered up and rendering in the printer can be quickly performed compared to a printing system which generates rendering data in units of pages.

However, the printer driver has to generate rendering data in units of bands based on rendering commands which are output from an application in an arbitrary order (irrelevant to the printing order in the printer). Therefore, the following problems arise: rendering commands must be sorted by considering the printing direction in the printer, which takes time; a rendered object which covers a plurality of bands must be divided into segments, so that processing time for generating the rendered object increases; and, if a rendered object cannot be divided into a plurality of bands, rendering data must be generated for each band, so that the amount of data of a print job increases.

For example, assume that a rendering command output from an application is a JPEG image object. In this case, in order to divide the image object by the printer driver in accordance with a plurality of bands, the image object of a JPEG format must be decompressed. Also, the divided image object must be transmitted to a print job and the image object cannot be re-converted to a JPEG format. Therefore, the data size of the print job increases. In a case of a general figure object, the figure object must be converted to a scan object in order to divide it. Therefore, the data size of the print job increases if header specification is performed to each scan object. Since the data size of a scan object is proportional to resolution, this is not suitable for a printing system of high resolution, such as 1200 DPI or 2400 DPI. Further, in a case of a character object, which cannot be divided, characters must be rendered in each band.

In the above-described printing system according to Japanese Patent Laid-Open No. 10-147017, when printing is started after all bands of a page have been rendered by memory deadlock of the printer, the timing of starting a printing operation is late compared to a band rendering method in which rendering is performed in synchronization with printing (first problem).

The capacity of memory for storing intermediate data (intermediate buffer, which will be described later) is limited, whereas the amount of intermediate data forming a page varies depending on the number, type, and size of rendered objects forming rendering data transmitted from the printer driver of a data processing apparatus and on the rendering position.

For example, when the size of intermediate data forming a page is large, a user may have to wait until the bands of previous pages are rendered and the memory for the intermediate data is released.

Further, when the size of intermediate data forming a page is very large, the available memory space for the intermediate data may be insufficient even if all bands of the previous pages have been rendered. In that case, one or more bands of a page for which intermediate data is being generated must be rendered in order to free enough memory for the intermediate data. At this time, if CMYK conversion or half-tone processing is performed on the rendered image data, the image data may not be adequately rendered depending on the rendering logic of rendering data thereafter.

Therefore, rendered image data should be ideally held in a form of an RGB image. However, the RGB image requires a very large memory and thus the image data is typically compressed according to a JPEG standard or the like. Even in a compressed form, the image data requires a large memory compared to a half-tone processed CMYK image. Further, image quality is degraded due to JPEG compression and processing speed decreases (second problem).

When band sorting is performed in order to generate a print job divided into bands in the printer driver of the host computer so that memory deadlock does not occur in the printer, as in Japanese Patent Laid-Open No. 2003-216361, generation of the print job delays due to increased processing load of the printer driver and first printout delays. Further, the amount of print data may increase by dividing data into bands. Therefore, even if band rendering can be performed in the printer, communication loads of a network increase disadvantageously (third problem).

SUMMARY OF THE INVENTION

The present invention has been made in order to solve the above-described problems and provides a printing system having improved printing throughput while realizing smaller memory space in a printing apparatus and reduced load on a printer driver.

In order to solve the above-described problems, the present invention provides a data processing apparatus, a printer driver, and a data processing method. The printer driver receives a plurality of rendered objects of each page generated by an application, sequentially converts the rendered objects to rendering commands which can be interpreted by a printing apparatus, and transfers the rendering commands to the printing apparatus. At this time, the printer driver detects the rendered object that should be rendered last in each of a plurality of bands, which are defined by dividing a page by the printing apparatus. Every time a last rendered object is detected, the printer driver converts the last rendered object to a rendering command and notifies the printing apparatus of end information indicating the end of processing of the corresponding band. Accordingly, intermediate data in a rendering-standby state can be rendered before intermediate data of an entire page is accumulated in the printing apparatus.

Also, the present invention provides a print control apparatus and print control method. In this apparatus and method, rendering information of each page from a data processing apparatus is converted to intermediate data, which is stored in an intermediate buffer. At this time, when end information indicating the end of conversion from rendered objects to rendering information in units of bands is received from the data processing apparatus, if intermediate data in a rendering-standby state is stored in the intermediate buffer, the intermediate data can be rendered before intermediate data of an entire page is generated. Accordingly, the intermediate buffer for storing intermediate data is not cluttered up and intermediate data can be efficiently rendered in units of bands. Further, degradation of the data processing speed and the image quality of the entire printing system can be prevented.

According to an aspect of the present invention, a data processing apparatus includes a printer driver capable of converting a plurality of rendered objects of each page generated by an application to rendering commands and transferring the rendering commands to a printing apparatus. The data processing apparatus includes: a converting unit for converting a plurality of rendered objects of each page generated by an application to rendering commands of each page which can be interpreted by the printing apparatus; a detecting unit for detecting the rendered object that should be rendered last in each of a plurality of bands, the bands being defined by dividing the page by the printing apparatus; and a notifying unit for notifying the printing apparatus of a print job together with end information indicating the end of processing in a corresponding band after converting the rendered object that should be rendered last to a rendering command in each band, every time the rendered object that should be rendered last in a band is detected by the detecting unit. The converting unit sequentially converts the rendered objects generated by the application to the rendering commands of each page which can be interpreted by the printing apparatus. The notifying unit notifies the printing apparatus of a print job including the rendering commands sequentially generated by the converting unit and end information.

According to another aspect of the present invention, a print control apparatus is capable of performing rendering in units of bands based on rendering commands of each page included in a print job received from a data processing apparatus. The print control apparatus includes an intermediate buffer for storing intermediate data which is converted based on the rendering commands received from the data processing apparatus and which can be internally processed; a rendering unit for rendering, in units of bands, the intermediate data stored in the intermediate buffer to image data which can be printed by a printing unit; a determination unit for determining whether end information indicating the end of specified band processing has been received from the data processing apparatus while the intermediate data is being buffered; and a control unit for allowing the specified band to be rendered by the rendering unit if the determination unit determines that the end information has been received. The control unit allows each band to be rendered by the rendering unit according to an order of end information of each band included in the print job.

According to the present invention, by using the data processing apparatus and the printer driver, intermediate data in a rendering-standby state can be rendered before intermediate data of an entire page is accumulated in the printing apparatus. Also, completion of generation of rendering information in units of bands can be appropriately notified.

In the printing apparatus, intermediate data is generated based on rendering information received from the data processing apparatus and the intermediate data is stored in the intermediate buffer. At this time, rendering can be started upon receiving information indicating the end of band processing before intermediate data of an entire page is accumulated. Therefore, the intermediate buffer for storing intermediate buffer is not cluttered up and intermediate data can be efficiently rendered in units of bands. Accordingly, degradation of the data processing speed and the image quality of the entire printing system can be prevented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 illustrates a memory map of a storage medium for storing various data processing programs which can be read by the printing system, to which the data processing apparatus and the print control apparatus of the present invention can be applied.

DESCRIPTION OF THE EMBODIMENTS

Hereinafter, embodiments of the present invention will be described with reference to the drawings.

First Embodiment

Figure 1:
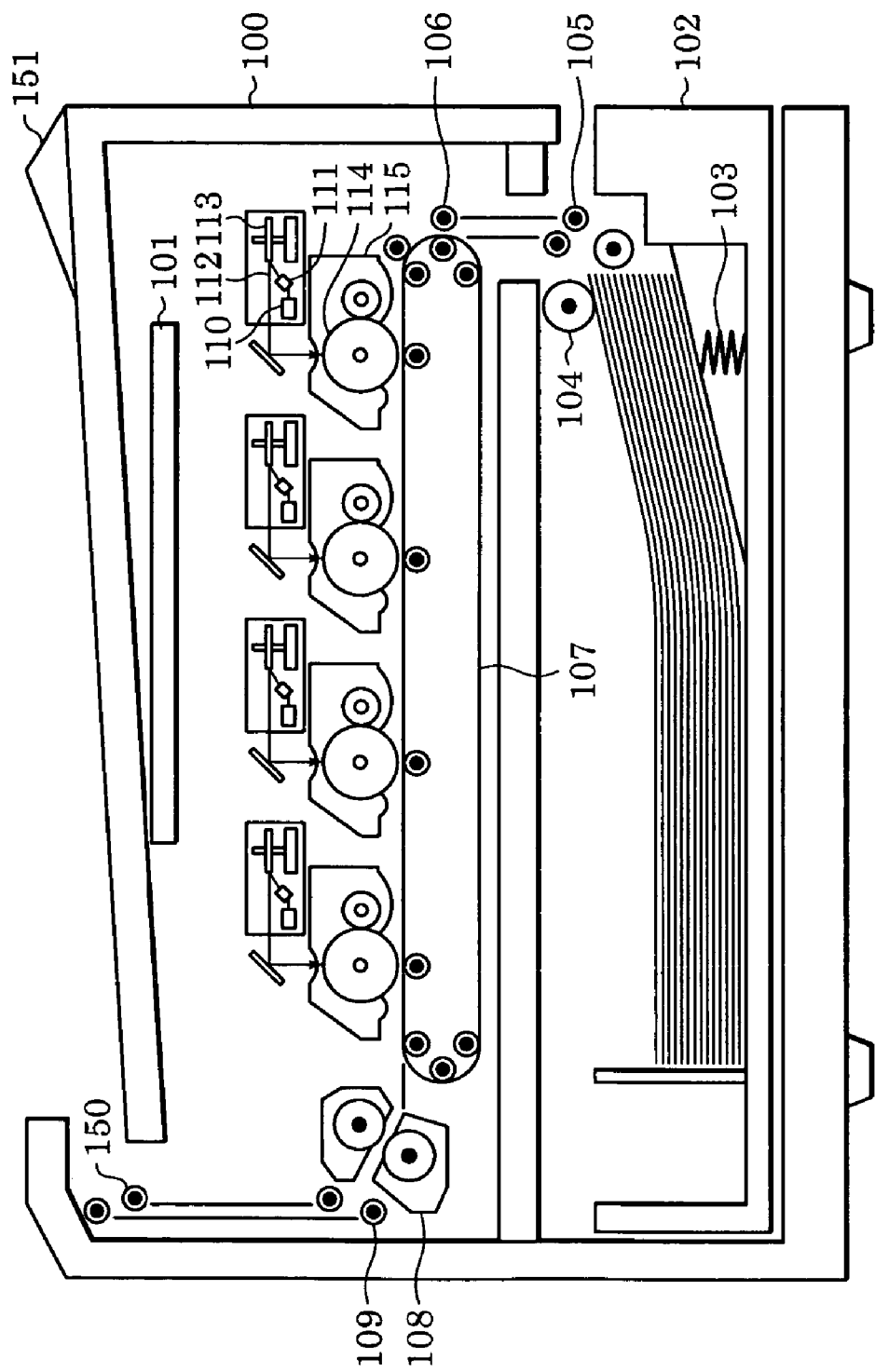
FIG. 1 is a cross-sectional view illustrating the configuration of a printing apparatus to which the present invention can be applied.

FIG. 1 is a cross-sectional view illustrating the configuration of a printing apparatus (corresponding to a print control apparatus of the present invention) to which the present invention can be applied. The printing apparatus is a laser beam printer (LBP), for example.

In FIG. 1, reference numeral 100 denotes the main body of the LBP. The LBP 100 generates character patterns, figures, and images according to a paper-size specifying command, a character printing command, a figure drawing command, an image rendering command, a color specifying command, and so forth, which are supplied from a computer (e.g., host computer 201 shown in FIG. 2, corresponding to a data processing apparatus of the present invention) connected through a LAN. Accordingly, the LBP 100 forms an image on a sheet of paper serving as a recording medium.

The LBP 100 shown in FIG. 1 includes an operation panel 151 where operation switches and LED and LCD display devices for displaying the status of the printer are provided. A printer control unit (printer controller) 101 controls the LBP 100 and analyzes a character printing command and so forth supplied from the computer.

The LBP 100 of this embodiment converts RGB color information to four pieces of color information: magenta (M), cyan (C), yellow (Y), and black (K), and forms and develops images by processing the four pieces of color information in parallel. Therefore, the LBP 100 includes image forming/developing mechanisms for respective M, C, Y, and K. The printer control unit 101 generates print images of the respective M, C, Y, and K, converts the images to video signals, and outputs the video signals to laser drivers for M, C, Y, and K, respectively.

A laser driver 110 for M serves as a circuit for driving a semiconductor laser 111 and switches ON/OFF of a laser beam 112 emitted from the semiconductor laser 111 according to an input video signal. The laser beam 112 is waved in the right and left directions by a rotary polygon mirror 113 so as to scan over an electrostatic drum 114. Accordingly, an electrostatic latent image of a character or figure pattern is formed on the electrostatic drum 114. The latent image is developed by a developing unit (toner cartridge) 115 around the electrostatic drum 114 and is transferred onto a recording sheet.

The same image forming/developing mechanism is provided for each of C, Y, and K. The function of each mechanism is the same as that for M, and thus the corresponding descriptions will be omitted.

Cut sheets are used as recording paper, which are accommodated in a paper feed tray 102 provided in the LBP 100 and are kept at a certain height by a spring 103. The cut sheet is taken into the apparatus by a feed roller 104 and carrier rollers 105 and 106, carried by a paper carrying belt 107, and passes through the image forming/developing mechanisms of MCYK.

The toner (ink power) of MCYK is transferred onto the cut sheet and is then fixed thereto by heat and pressure by a fuser 108. Then, the cut sheet is output to the upper part of the LBP 100 by carrier rollers 109 and 150.

Figure 2:
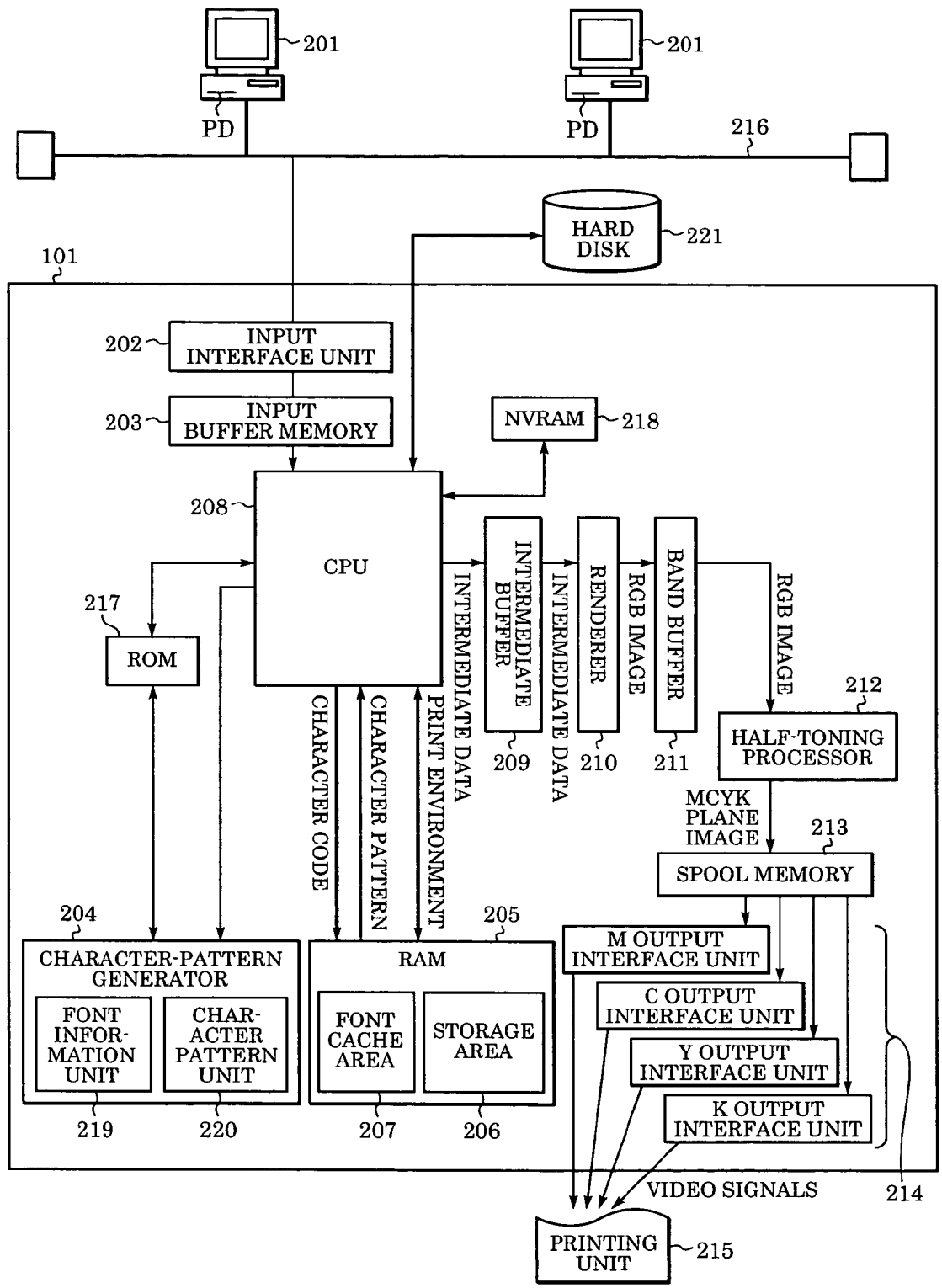
FIG. 2 is a block diagram showing a schematic configuration of a printer controller of the laser beam printer (LBP) shown in FIG. 1.

FIG. 2 is a block diagram showing a schematic configuration of the printer controller 101 of the LBP 100 shown in FIG. 1. The printer controller 101 prints document information and so on in units of pages by inputting print data including rendering commands of characters, figures, and images and color information included in a print job, which is transmitted via a printer driver PD of a computer 201 connected through a local area network (LAN) 216, and by rendering the print data in units of bands.

The host computer 201 includes hardware resources, such as a central processing unit (CPU), random access memory (RAM), read-only memory (ROM), etc. (not shown), as a so-called personal computer, and executes various applications by using a user interface (UI) under the control of a predetermined operating system (OS) which is stored in a hard disk or the like. When a user inputs a print request by operating an input device, the host computer 201 converts rendering data to PDL data (print data described in a page description language) which can be analyzed by the printer and transfers the data to the printer driver PD.

An input interface unit 202 transmits/receives various information to/from the computer 201. An input buffer memory 203 temporarily stores various information input via the input interface unit 202. A character-pattern generator 204 includes a font information unit 219 which stores attributes such as the width and height of characters and addresses of actual character patterns, a character pattern unit 220 which stores character patterns, and a read control program. The read control program is contained in a ROM 217 and has a code converting function for calculating the address of a character pattern corresponding to an input character code.

A RAM 205 includes a font cache area 207 which stores character patterns output from the character-pattern generator 204 and a storage area 206 which stores an extended font transmitted from the computer 201 and a current print environment.

By storing pattern information which has been expanded to a character pattern as a font cache in the font cache area 207, the same character need not be decoded and expanded again so as to print it, so that expansion to a character pattern can be quickly performed.

A CPU 208 controls the control unit of the printer and also controls the apparatus according to a control program stored in the ROM 217. An intermediate buffer 209 holds an internal data group generated based on input data. After data of one page has been received and converted to simpler intermediate data, and then the intermediate data has been accumulated in the intermediate buffer 209, if it is detected that intermediate data of a band has been generated or intermediate data of one page has been generated, the intermediate data is rendered by a renderer 210 in units of bands and is output to a band buffer 211 as an RGB image, each color having 8 bits. In this embodiment, the printer renders data into an RGB image, each color having 8 bits. However, the present invention is not limited to such a printer. For example, a 1-bit monochrome printer or a color printer which renders data into an MCYK image, each color having 4 bits, may be adopted.

The RGB image output to the band buffer 211 is converted to an MCYK image, each color having 1 bit, by a half-toning processor 212. Then, the MCYK image is separated into respective MCYK planes and stored in a spool memory 213. Each of the MCYK planes stored in the spool memory 213 is compressed and is held therein. After data of all bands of one page has been stored, a printing unit 215, serving as a printing mechanism of a page printer, is started. Then, the respective MCYK planes are expanded and are converted to video signals by an output interface unit 214, and then the video signals are output to the printing unit 215.

In this way, generation of intermediate data of each band and control of the renderer 210 are performed as separate tasks by the CPU 208. Higher priority is given to the control of the renderer 210, but rendering is performed by the renderer 210, and thus intermediate data of each band is generated by the CPU 208 while each band is being rendered.

As described above with reference to FIG. 1, the LBP of this embodiment forms and develops MCYK images in parallel. For this purpose, the output interface unit 214 consists of an M output interface unit, a C output interface unit, a Y output interface unit, and a K output interface unit. The respective interface units independently read plane images from the spool memory 213, convert the images to video signals, and output the video signals to laser drivers 110, 120, 130, and 140 of the respective planes.

A nonvolatile memory 218 includes a general EEPROM or the like and is hereinafter referred to as an NVRAM (non-volatile RAM). A panel setting value and so on specified by the operation panel 151 is stored in the NVRAM 218.

The ROM 217 contains programs for analyzing data input from the computers 201, generating intermediate data, and controlling the printing mechanism main unit (printing unit) 215, and a color conversion table for converting RGB color space to MCYK color space.

A hard disk 221 is a nonvolatile memory medium capable of recording information. Since the memory is nonvolatile, the recorded information is not lost even when the power is turned off.

Figure 3:
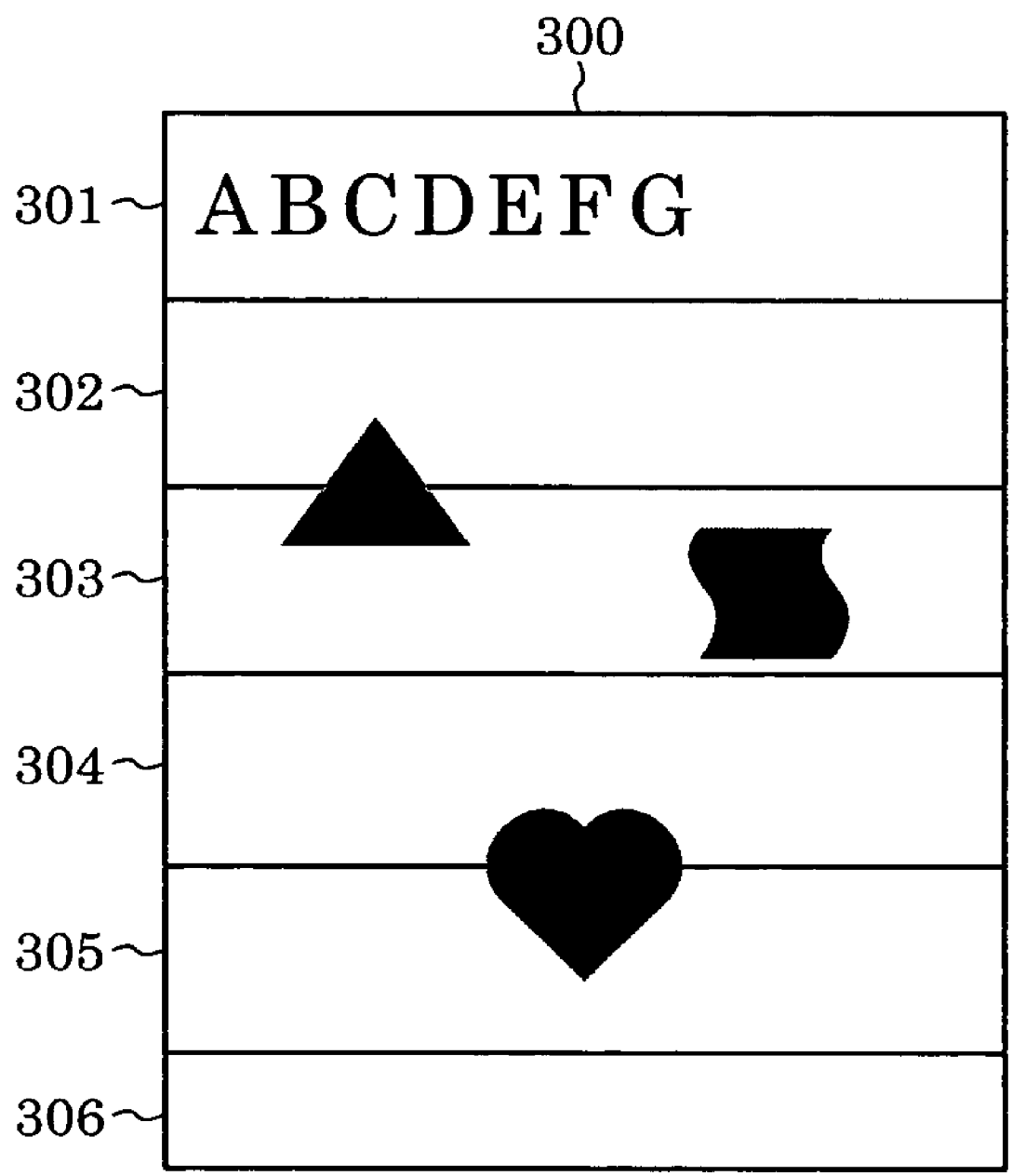
FIG. 3 is a schematic view illustrating band processing by the printer controller shown in FIG. 2.

FIG. 3 is a schematic view illustrating a band processing state by the printer controller 101 shown in FIG. 2, in which a page is divided into bands.

In FIG. 3, reference numeral 300 denotes a sheet of paper, for example, an A4 sheet of paper in a portrait orientation. In this embodiment, the A4 sheet of paper 300 is processed while being divided into 6 areas 301 to 306.

Character printing commands, figure drawing commands, image rendering commands, and so on included in print data of a PDL format transmitted from the host computer 201 are stored in the RAM 205, analyzed by the CPU 208, converted to intermediate data of the bands 301 to 306 depending on the position and size of rendered objects, and then stored in the intermediate buffer 209. If a rendered object lies across a plurality of bands, the object is divided into segments and the segments are regarded as intermediate data of respective bands.

Figure 4:
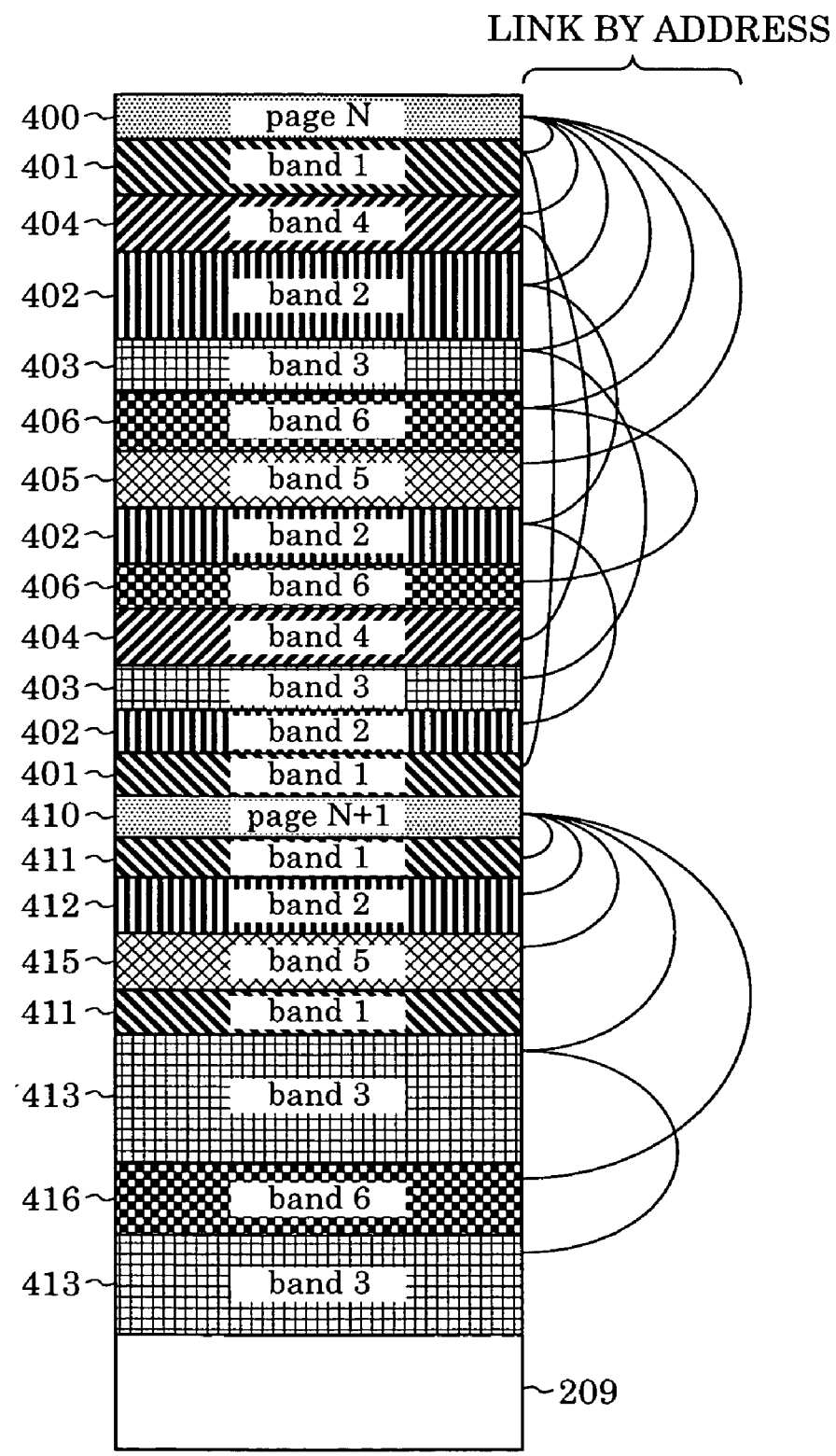
FIG. 4 illustrates the configuration of the intermediate buffer shown in FIG. 2.

FIG. 4 illustrates the structure of the intermediate buffer 209 shown in FIG. 2. When generation of a page is started, an area for holding the starting address of the intermediate data of each band is allocated in the intermediate buffer 209. This area is called a page top area.

In FIG. 4, reference numeral 400 denotes a page top area of the N-th page. The starting address of any band is not set at the page top area just after generation of the page has started. The starting address of each band is not set at the page top area until the intermediate data of the band is generated. For example, when the CPU 208 analyzes print data of a PDL format in order to generate intermediate data, if the position of a rendered object which is analyzed first is in band 1 (301 in FIG. 3), an area 401 for holding the starting address of the intermediate data of band 1 is allocated in the intermediate buffer 209, and the intermediate data is stored in the allocated area 401. If the position of a rendered object which is analyzed next is in band 4 (304 in FIG. 3), an area 404 for holding the starting address of the intermediate data of band 4 is allocated in the intermediate buffer 209, and the intermediate data is stored in the allocated area 404. In this way, data of a PDL format received from the host computer is sequentially analyzed in order to generate intermediate data, an intermediate-data storing area corresponding to each band of the intermediate data is allocated in the intermediate buffer 209, and then the generated intermediate data is stored therein.

An adequate area is allocated to each band as necessary, and the area is expanded when the area becomes full of intermediate data. If the area cannot be expanded as a continuous area, another area is allocated and is linked by an address. In that case, the area is searched for a lower address. If there is no free space in the lower address, a search is performed from the starting address of the intermediate buffer 209. For example, when an intermediate-data storing area 401 allocated as band 1 becomes full of intermediate data, the area 401 is expanded. If the area 401 cannot be expanded as a continuous area, another area 401 (at the center of FIG. 4) is allocated and is linked by an address.

FIG. 4 shows a state where the intermediate data of the N-th page has been generated and the intermediate data of the N+1-th page is being generated from the page top area 410. Reference numerals 401, 402, 403, 404, 405, and 406 denote the intermediate data of the bands 301, 302, 303, 304, 305, and 306 corresponding to the N-th page.

If there is free space in the band buffer 211, the intermediate data of the N-th page is rendered by the renderer 210 shown in FIG. 2, so that the intermediate data of the rendered bands can be released.

However, the band buffer 211 is not provided with enough memory for holding images of a plurality of bands, and the amount of free space of the spool memory 213 substantially has an influence on the timing of rendering.

Reference numeral 410 denotes the page top area of the N+1-th page, and reference numerals 411, 412, 413, 415, and 416 denote the intermediate data of the bands 301, 302, 303, 305, and 306 corresponding to the N+1-th page. The absence of the intermediate data of the band 304 means that no rendered object exists in the band at this moment.

Figure 5:
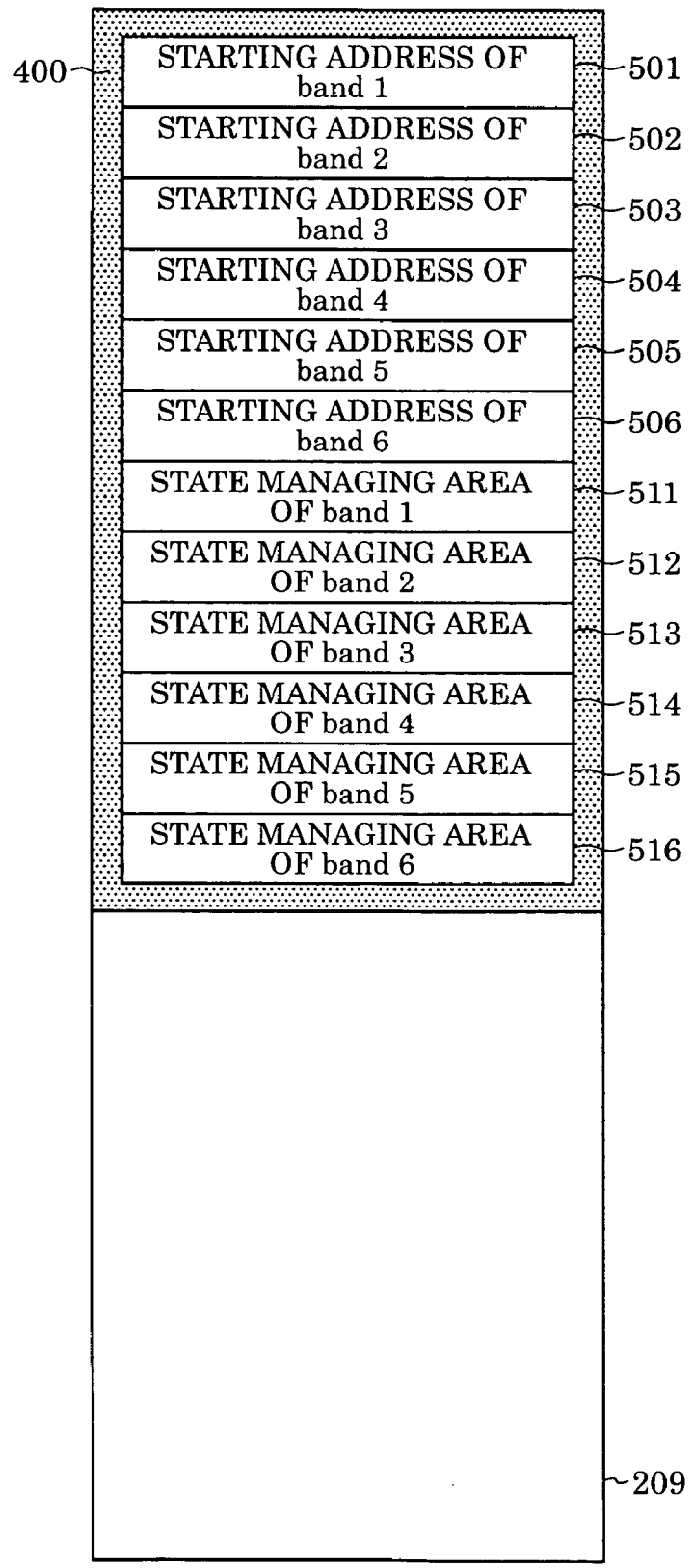
FIG. 5 illustrates the configuration of the page top area shown in FIG. 4.

FIG. 5 illustrates a more specific configuration of the page top area shown in FIG. 4.

In FIG. 5, reference numerals 501, 502, 503, 504, 505, and 506 denote areas for storing the starting addresses of intermediate data of the corresponding bands 301, 302, 303, 304, 305, and 306 in the intermediate buffer 209.

Reference numerals 511, 512, 513, 514, 515, and 516 denote areas for managing the state of the bands 301, 302, 303, 304, 305, and 306, where a value from 0 to 2 (a state variable indicating the following state) is set. That is, each of the areas 511, 512, 513, 514, 515, and 516 is set to one of 0: intermediate data is being generated; 1: intermediate data has been generated (rendering can be started); and 2: rendering has been done (intermediate data can be released).

Normally, the CPU 208 sets the state managing areas 511, 512, 513, 514, 515, and 516 to a value of "1" when generation of the intermediate data of the page is completed by a paper ejection command. However, the state managing area of a specific band may be set to a value of "1" upon notification that the specific band has been generated from the host computer 201. In the present invention, when end information indicating the end of a band is described in the print data, the state managing area of a specific band is set to "1" upon completion of generation of the intermediate data of the specific band. On the other hand, when print data which does not include conventional band end information is processed, the CPU 208 sets the state managing area to "1" upon completion of generation of the intermediate data of the page.

The completion of generation of a specific band is notified from the host computer 201 by using a PDL command, as in a character printing command, a figure drawing command, and an image rendering command. This command is called a band end notification command (or more simply, band end information).

For example, assume that the intermediate data of the N-th page is generated in the order of the bands 306, 301, 302, 305, 303, and 304, and that a band end notification command is received every time a rendered object of each band is generated. In that case, band end information of the bands 306, 301, 302, 305, and 303 is received before the intermediate data of the page is generated, and thus rendering of the corresponding band can be started. Rendering is sequentially performed by the renderer 210 from the band in which the intermediate data has been generated. The rendered image data in the band buffer 211 is processed and is stored in the spool memory 213. After image data of one page has been generated, the spool memory 213 outputs the image data in a form of video signals through the output interface unit 214 to the printing unit 215, and then the image data is printed.

In that case, some bands of the N-th page have been rendered at the time of starting generation of the intermediate data of the N+1-th page, so that the intermediate data of the rendered bands can be released.

Although the intermediate-data generating process and the rendering process are executed in parallel as independent tasks, acquisition and release of a memory area cannot be performed at the same time. Therefore, when rendering of a band is completed, the state managing area of the band (areas 516, 511, 512, 515, and 513 corresponding to the bands 306, 301, 302, 305, and 303) is set to "2", and a releasable memory of a band is actually released by the CPU 208 as necessary when a memory is obtained.

Figure 6:
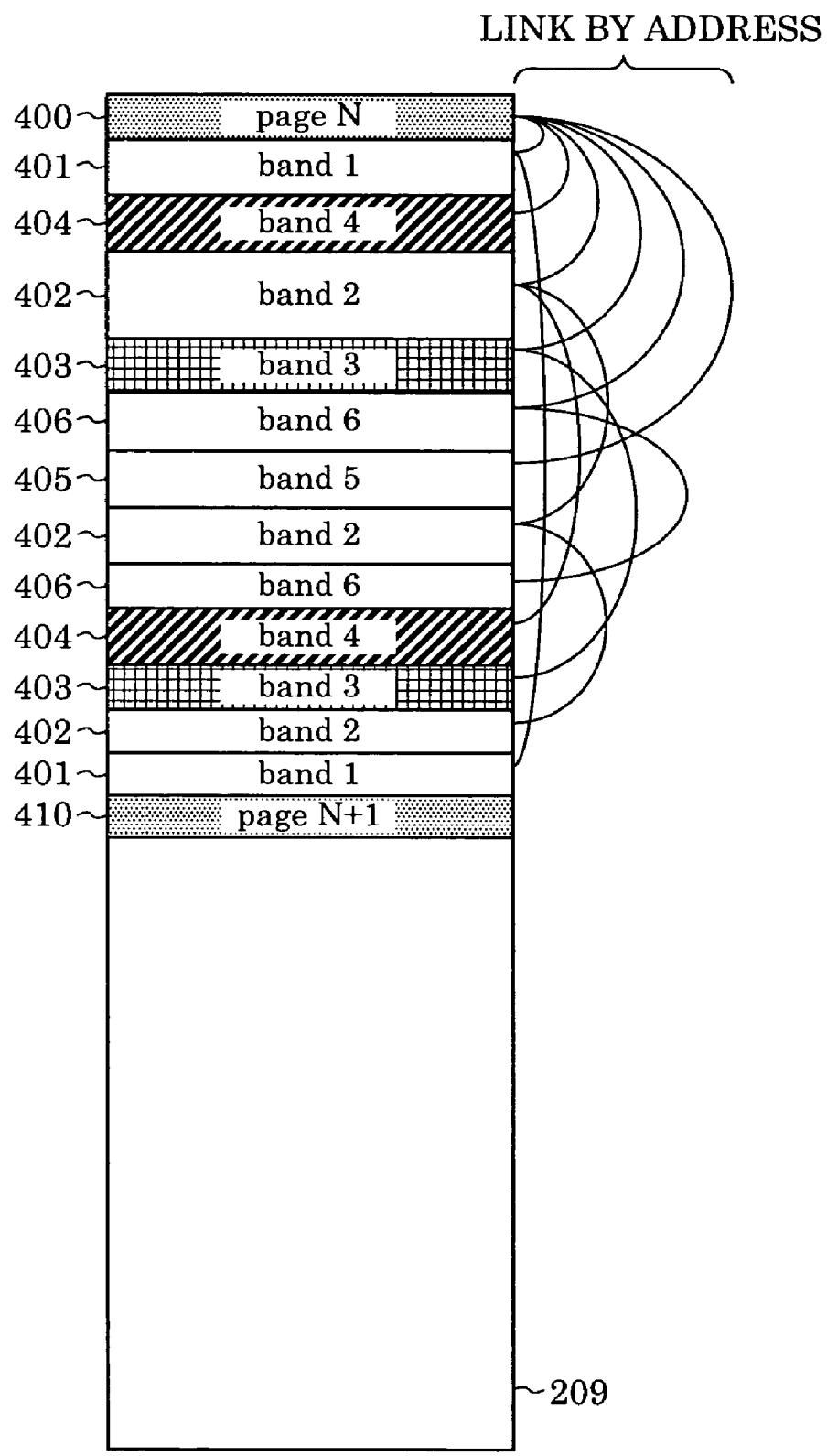
FIG. 6 shows an example of the state of the intermediate buffer shown in FIG. 2.

FIG. 6 shows an example of the state of the intermediate buffer 209 shown in FIG. 2. This state corresponds to a state at the time when the generation of the intermediate data of the N+1-th page is to be started. A non-shaded area for storing intermediate data indicates that "2" is set to the state managing area of the band.

In the example shown in FIG. 6, the bands 306, 301, 302, and 305 of the N-th page have been rendered by the renderer 210, and thus the memory corresponding to the intermediate-data storing areas of the bands can be released. Also, FIG. 6 shows that the bands 303 and 304 of the N-th page are not yet rendered at the time when generation of the intermediate data of the N+1-th page is started and that the memory thereof cannot be released.

Next, various types of command processing and a process of generating intermediate data of one page performed by the CPU 208 shown in FIG. 2 will be described with reference to the flowchart shown in FIG. 7.

Figure 7:
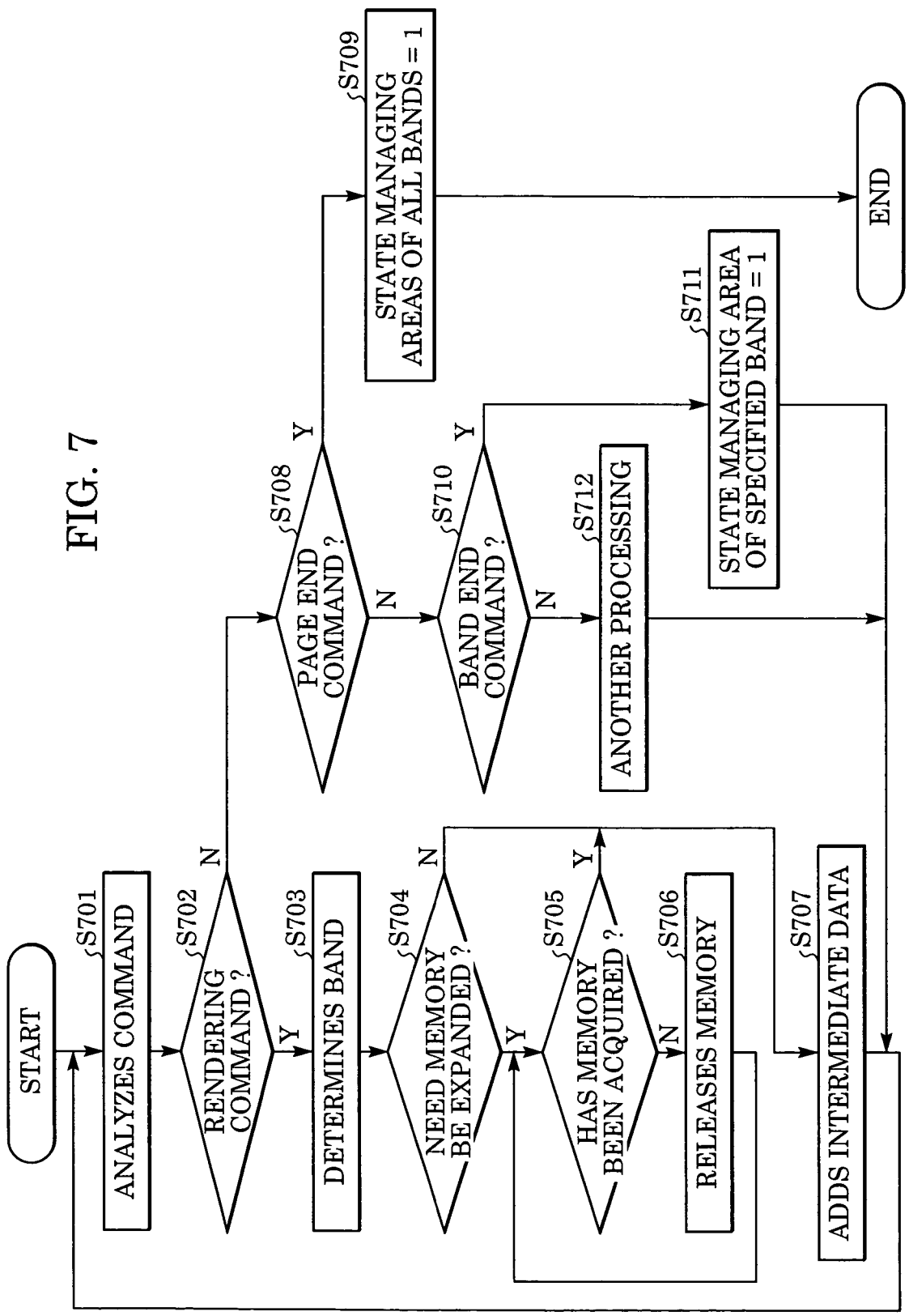
FIG. 7 is a flowchart showing an example of the first data processing in the print control apparatus according to the present invention.

FIG. 7 is a flowchart showing an example of first data processing in the print control apparatus according to the present invention, which corresponds to a procedure of various types of command processing and a process of generating intermediate data of one page performed by the CPU 208 shown in FIG. 2. S701 to S712 denote the steps of the process. The control program corresponding to the procedure of each step is stored in the ROM 217 or the like, and the control program is loaded into the work area of the RAM 205 and is executed.

First, in step S701, the CPU 208 reads print data received from the host computer 201 from the input buffer memory 203 and analyzes a PDL command. In step S702, the CPU 208 determines whether the command is a command of rendering a character, figure, or image. If it is determined that the command is a rendering command, the process proceeds to step S703, where the CPU 208 determines the band to which the rendered object is to be rendered based on the position and size of the rendered object. After the CPU 208 has determined the band to which the object is to be rendered, the process proceeds to step S704, where the CPU 208 determines whether the intermediate-data memory allocated for the band needs to be expanded. If it is determined that the memory does not need to be expanded, that is, if the intermediate data to be added can be accommodated in the allocated area, the process proceeds to step S707, where the intermediate data is added, and then the process returns to step S701.

On the other hand, if it is determined that the intermediate-data memory needs to be expanded in step S704, the process proceeds to step S705, where acquisition of a memory is tried and then the CPU 208 determines whether the memory has been successfully acquired. If the memory cannot be acquired, the process proceeds to step S706, where a releasable memory area is released, and then the process returns to step S705, where acquisition of a memory is tried again.

On the other hand, if it is determined that a memory can be acquired in step S705, the process proceeds to step S707, where the intermediate data is added to the acquired area, and then the process returns to step S701, where the CPU 208 analyzes the next command.

The step of releasing a memory performed by the CPU 208 in step S706 is performed on the band in which a value "2", (indicating that rendering has been done) is set in the band state managing area by referring to the page top areas of the page which is being processed and the previous page(s). The storing area of the starting address of the intermediate data of the released band is set to a value of "0".

If the CPU 208 has released the intermediate data of all the bands of the page to be released on the intermediate buffer 209, the CPU 208 also releases the page top area of the page.

If in step S702 the CPU 208 determines that the command is not a rendering, the process proceeds to step S708, where the CPU 208 determines whether the command is a page end command (page end information). If the command is a page end command, the process proceeds to step S709, where the CPU 208 sets the state managing areas of all the bands of the page to "1" (intermediate data has been generated), so that the process of generating the intermediate data of the page is completed. The process then ends.

If it is determined in step S708 that the command is not a page end command, the process proceeds to step S710, where the CPU 208 determines whether the command is a band end command (the parameter of a band end command includes a band number). If the CPU 208 determines that the command is a band end command, the process proceeds to step S711, where the CPU 208 sets the state managing area of the specified band to "1" (intermediate data has been generated), and then the process returns to step S701. That is, the CPU 208 shifts the band specified by the band end command to a rendering-standby state where the band can be rendered by the renderer 210 (the band state managing area is set to "1").

In this embodiment, the format of the band end command is Esc <band> BE. Herein, "Esc" is "1B" of a hexadecimal number and is a code indicating the start of a control command. "<band>" is a parameter of a main control command and indicates a band number. "B" and "E" indicate the type of control command by 2 bytes.

On the other hand, if the CPU 208 determines in step S710 that the command is another command, the process proceeds to step S712, where the processing corresponding to the command is performed, and the process returns to step S701.

The above-mentioned another command is a command for specifying the character size, for example, but this is not directly related to the present invention and the corresponding description will be omitted.

In this way, the CPU 208 (control unit of the present invention) executes control so that each band is sequentially rendered by the renderer 210 according to the end information of each band in an order included in a print job.

In this embodiment, if no band end command is used in print data, as in conventional print data of a PDL format, that is, if step S711 is not performed, rendering of each band is started after the intermediate data of one page has been generated. This is the same as the conventional printing system. The print control apparatus of the present invention receives print data including band end information and sequentially renders the print data from a band in which the intermediate data has been generated. Accordingly, a rendering process can be finished earlier and the throughput can be improved. Further, the rendering process can be performed without storing intermediate data of an entire page by releasing memory areas for rendered bands one after another, and thus the capacity of the memory can be reduced and also the cost can be reduced. Further, the print control apparatus of the present invention is capable of realizing a printing operation by performing rendering according to the generation of the intermediate data of one page even if no band end command is included as in conventional print data of a PDL format. Therefore, even if the printer driver of the host computer is of an old version, a printing operation can be ensured as a system.

Next, a rendering process will be described with reference to the flowchart shown in FIG. 8.

Figure 8:
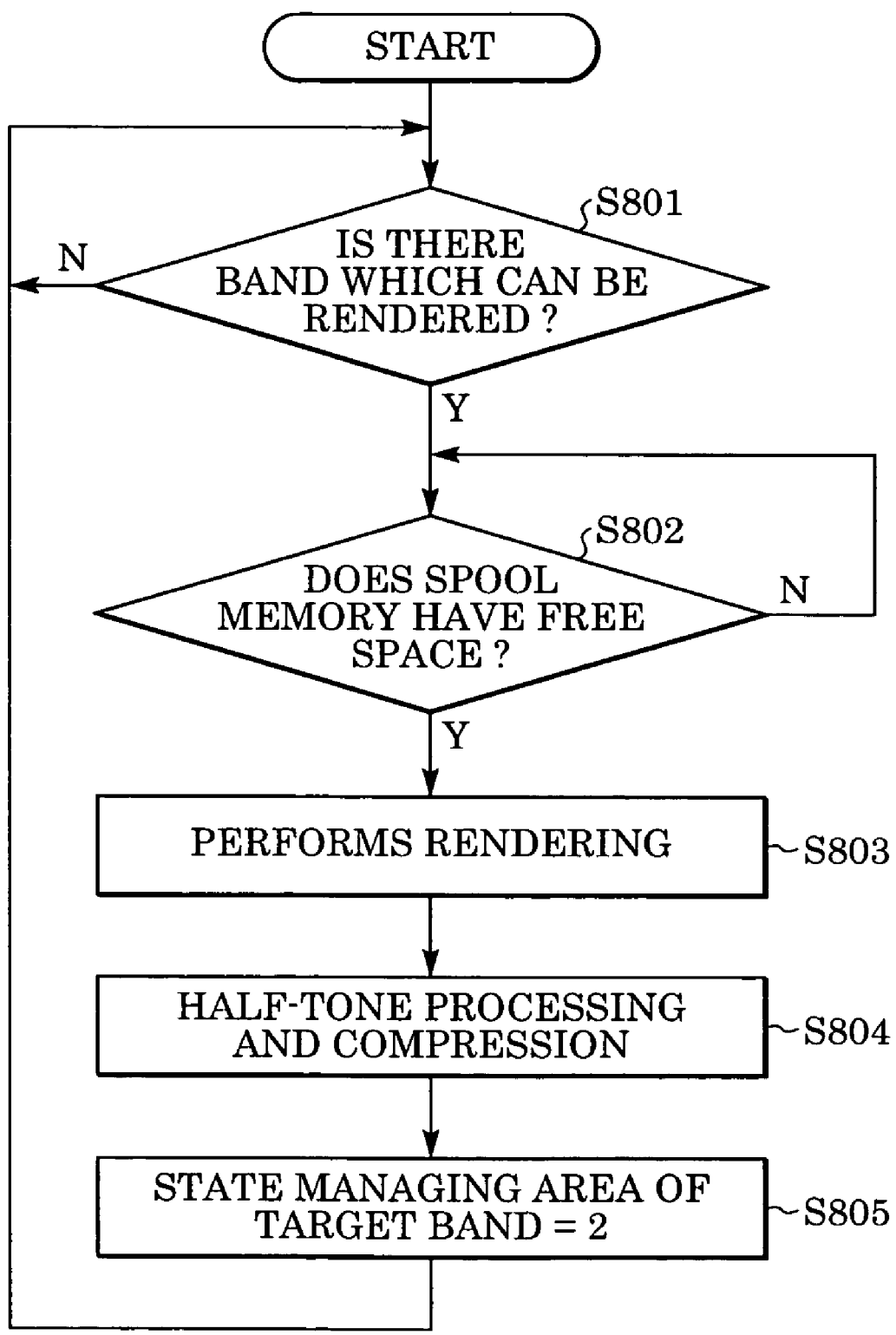
FIG. 8 is a flowchart showing an example of the second data processing in the print control apparatus according to the present invention.

FIG. 8 is a flowchart showing an example of second data processing in the print control apparatus according to the present invention and corresponds to a rendering process performed by the renderer 210 which is controlled by the CPU 208 shown in FIG. 2. Since the renderer 210 is formed of hardware, steps S801 to S805 are performed independently in parallel with the process of generating intermediate data performed by the CPU 208. However, the rendering process is performed as a higher-priority task than the process of generating intermediate data. Therefore, the renderer 210 can access the intermediate buffer 209 prior to the CPU 208. This task is called a rendering task.

In the rendering task, the state of the intermediate buffer 209 is polled. In step S801, it is determined whether a band which can be rendered exists, that is, a band in which the state managing area 1 is set to "1" (intermediate data has been generated). If it is determined that a band which can be rendered does not exist, the existence is determined again at predetermined polling intervals.

If it is determined in step S801 that a band which can be rendered exists, the process proceeds to step S802, where it is determined whether there is free space in the spool memory 213.

In order to ensure a normal operation, an area for storing a halftone CMYK plane image in an uncompressed state is required. However, since the CMYK plane image is actually compressed, only a small percentage of the area is occupied if the image is a normal image.

In step S802, if it is determined that the spool memory 213 does not have free space for storing a CMYK plane image in an uncompressed state, the determination is performed again at predetermined polling intervals.

If it is determined that the spool memory 213 has free space in step S802, the process proceeds to step S803, where the address of the intermediate data of the band and the address of the band buffer 211 is set to the renderer 210 and rendering is performed. The rendering result is output to the band buffer 211 as an RGB image.

After rendering has been completed, the process proceeds to step S804, where the RGB image is converted to image data of CMYK, each color having 2 BPP (bits per pixel), by the half-toning processor 212. Then, the image data is output to the spool memory 213 and is compressed in each plane.

Then, in step S805, the band state managing area of the target band is set to a value of "2" (rendering is completed), and the process returns to step S801.

As described with reference to FIGS. 7 and 8, each band is sequentially rendered from a band which is specified by a band end notification command. When image data of all bands of one page is stored in the spool memory 213, the page is in a print-standby state, so that the image data is output in synchronization with the printing unit 215.

Next, the processing of the printer driver PD, which is a program in the host computer 201, will be described.

The printer driver PD is stored in a hard disk or the like in the host computer 201 and serves as a print control program which constantly exists in a predetermined area of the RAM at startup of the system. The printer driver PD has a unit for determining the last object that is rendered to each band.

Figure 14:
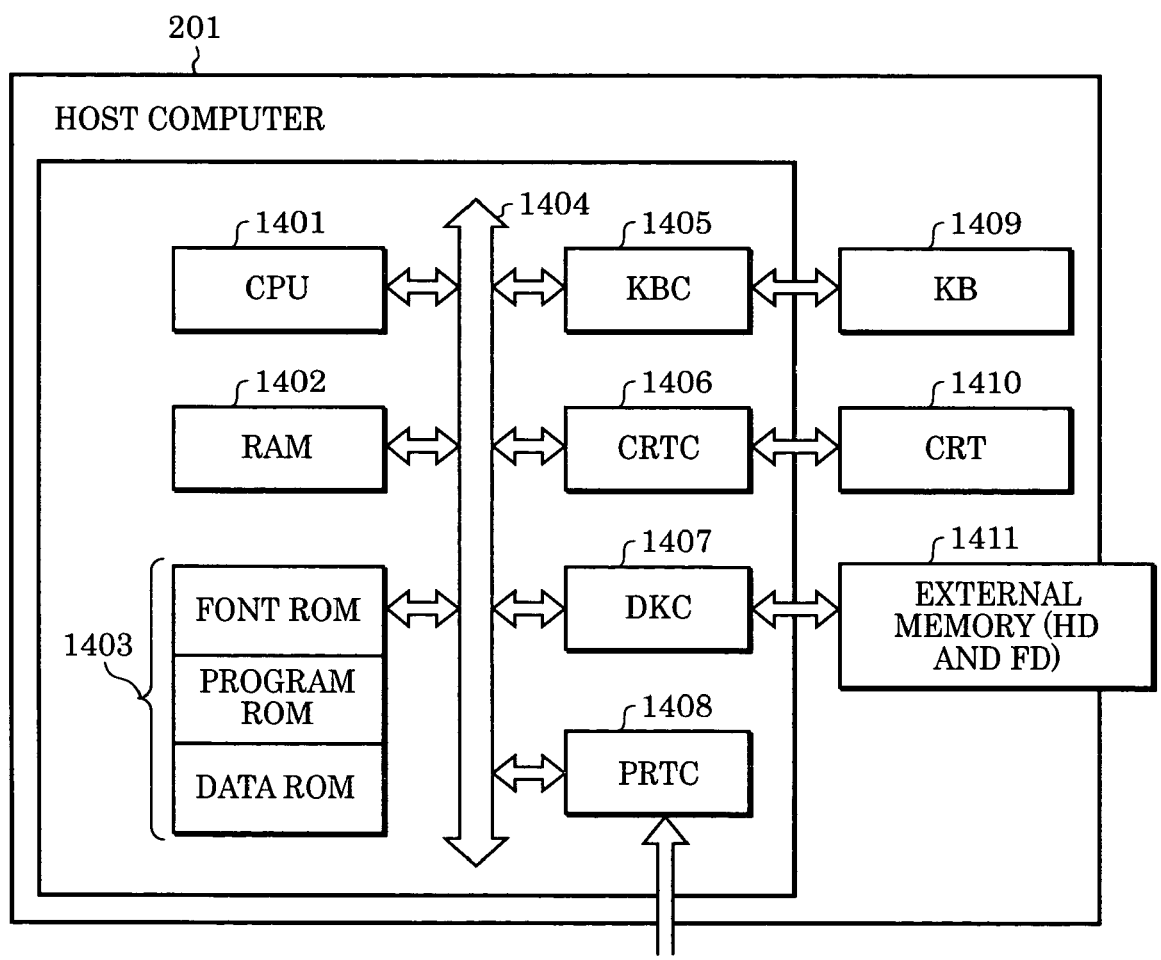
FIG. 14 is a block diagram showing a schematic configuration of the data processing apparatus of the present invention.

First, the host computer (201 in FIG. 2) corresponding to the data processing apparatus of the present invention will be described with reference to FIG. 14. The host computer 201 includes a CPU 1401, a RAM 1402, a ROM 1403, a keyboard controller (KBC) 1405, a CRT controller (CRTC) 1406, a disk controller (DKC) 1407, and a printer controller (PRTC) 1408, which are mutually connected through a system bus 1404.

The CPU 1401 processes a document including mixture of figures, images, characters, and tables (including table calculation) based on a document processing program or the like which is stored in the ROM 1403 serving as a program ROM or in an external memory 1411, and controls each device connected to the system bus 1404. Also, the CPU 1401 executes rasterization of an outline font to a display-information RAM set on the RAM 1402, so that WYSIWYG (what you see is what you get) on the CRT 1410 is realized. Further, the CPU 1401 opens various registered windows based on commands specified by a mouse cursor or the like (not shown) on the CRT 1410 and executes various data processing.

An OS or the like is stored in the program ROM of the ROM 1403 or the external memory 1411, font data and so on used for processing documents is stored in the font ROM of the ROM 1403 or the external memory 1411, and various data used for processing documents are stored in the data ROM of the ROM 1403 or the external memory 1411. The RAM 1402 is a main memory of the CPU 1401 and serves as a work area.

The keyboard controller (KBC) 1405 controls key input from a keyboard (KB) 1409 and a pointing device (not shown). The CRT controller (CRTC) 1406 controls display on a CRT display (CRT) 1410. The disk controller (DKC) 1407 controls access with the external memory 1411, such as a hard disk (HD) and a floppy disk (FD). The hard disk (HD) stores a boot program, various applications, font data, user files, edit files, a printer-control-command generating program (hereinafter referred to as a printer driver), and so on.

The printer controller (PRTC) 1408 is connected to a bidirectional interface or a network (LAN 216) and executes communication control processing for the printer 101. When a user performs a printing operation, he/she opens a window of print setting and sets a printing method to the printer driver in order to perform setting of the printer and select a printing mode.

Figure 15:
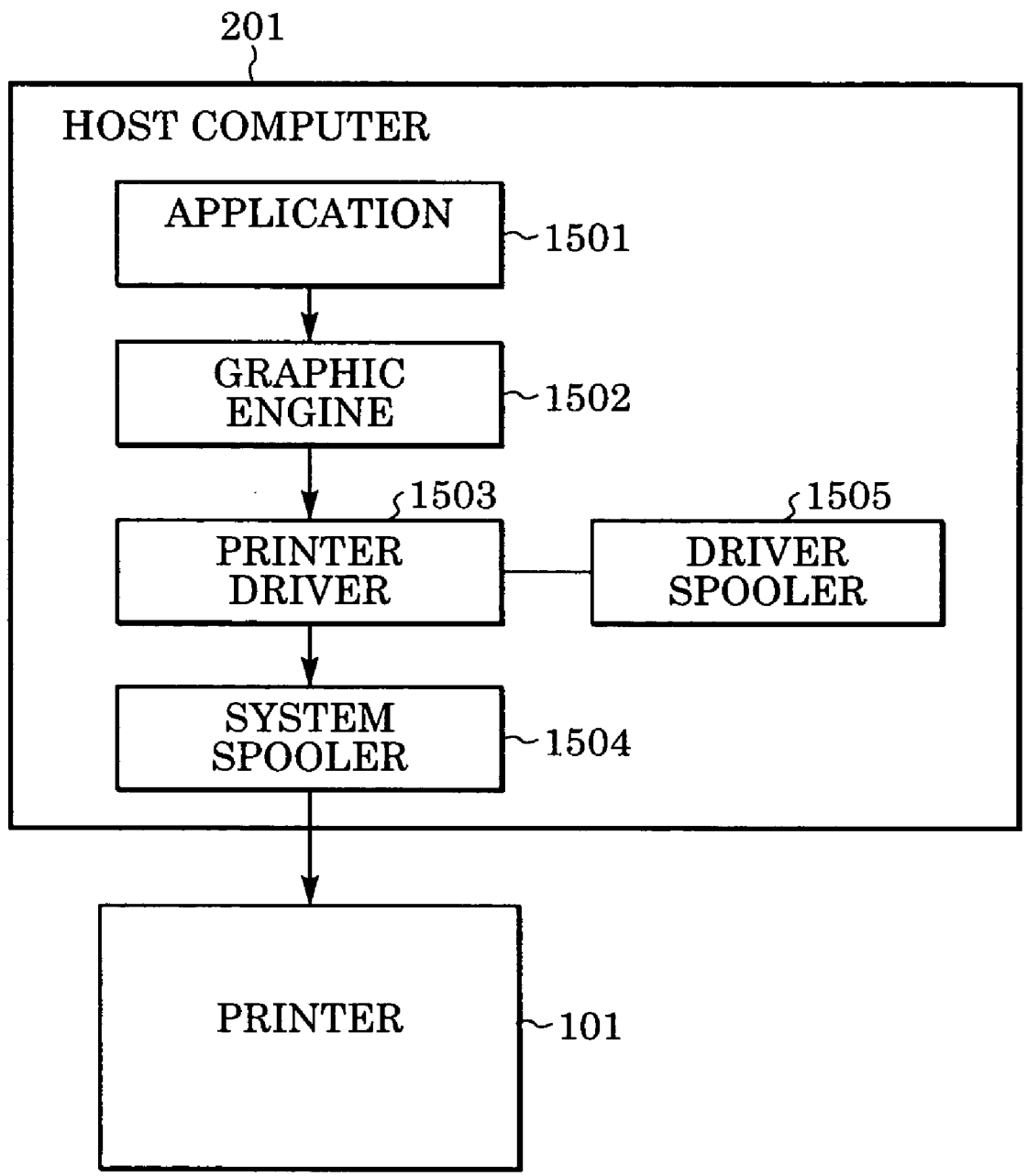
FIG. 15 is a functional block diagram showing the module configuration of the data processing apparatus of the present invention.

Next, a typical printing process in the host computer 201 will be described with reference to FIG. 15. An application 1501, a graphic engine 1502, a printer driver 1503, and a system spooler 1504 are program modules which exist as files stored in the external memory 1411 and which are loaded to the RAM 1402 by the OS or a module using the module so as to be executed. The application 1501 and the printer driver 1503 can be added to the external memory 1411 through the FD of the external memory 1411, a CD-ROM (not shown), or a network (not shown). The application 1501, which is stored in the external memory 1411, is loaded to the RAM 1402 and is executed. However, when printing is performed from the application 1501 to the printer 101, data is output (rendered) by using the graphic engine 1502, which has been loaded to the RAM 1402 and has become executable.

The graphic engine 1502 loads the printer driver 1503, which is prepared for each printer, from the external memory 1411 to the RAM 1402, and converts the output from the application 1501 to a printer control command by using the printer driver 1503. The converted printer control command is output to the printer 101 via the system spooler 1504, which is loaded to the RAM 1402 by the OS, and the bidirectional interface.

Also, when the printer driver 1503 converts rendering data from the application 1501 to print data of a PDL format, the printer driver 1503 temporarily stores rendering data of each page in the driver spooler 1505 in order to determine each piece of rendering data corresponds to which of bands divided in consideration of the paper eject direction from the printer and to determine the last rendering data of each band. This operation will be described later.

Figure 9:
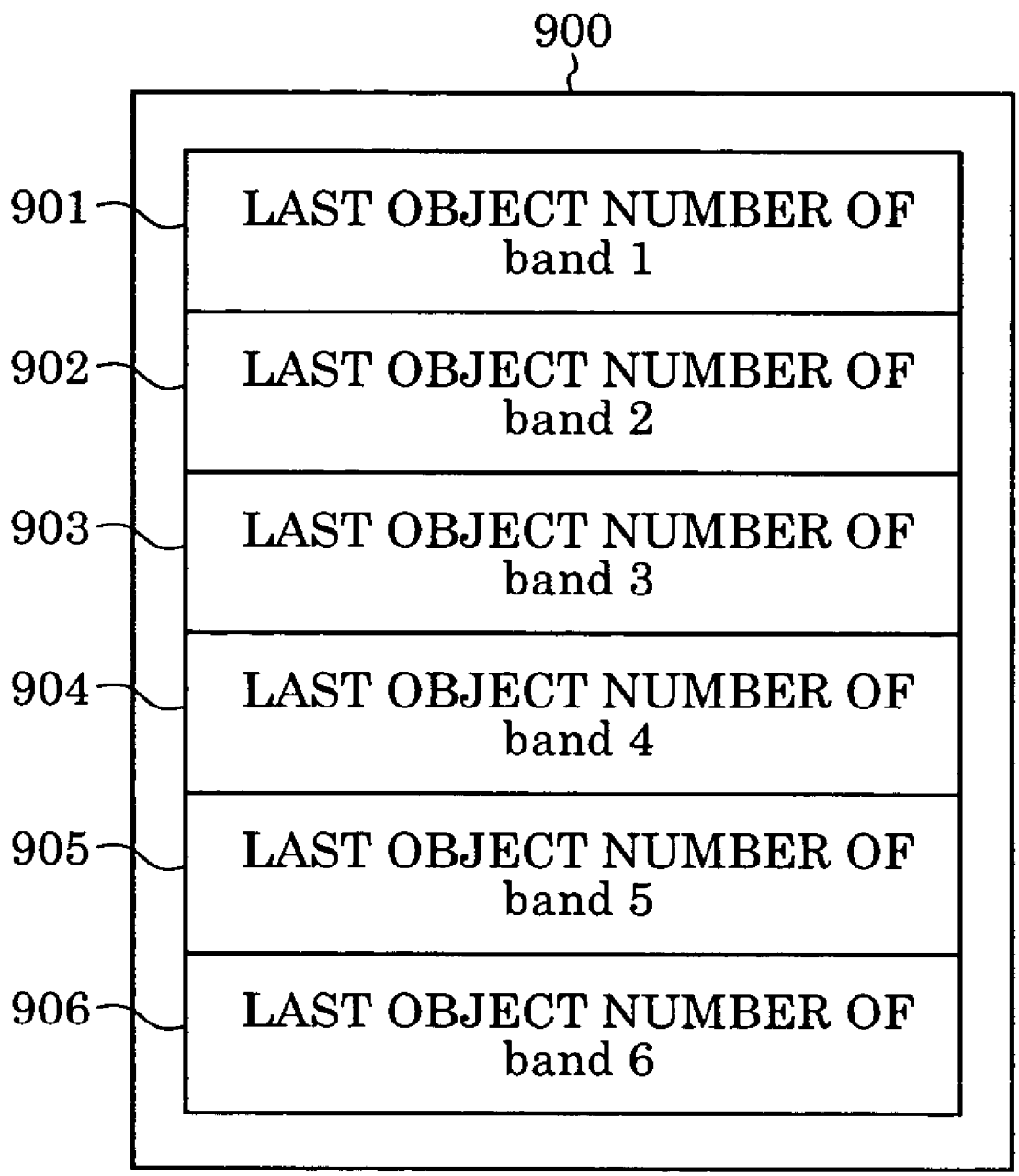
FIG. 9 illustrates a first memory area for managing objects by the printer driver of a host computer shown in FIG. 2.

FIG. 9 illustrates a first memory area for managing objects by the printer driver PD (1503 in FIG. 15) of the host computer 201 shown in FIG. 2 and corresponds to a memory area for managing last rendered objects.

In FIG. 9, reference numeral 900 denotes an area for storing information for managing a last object rendered in each band, the area being called a last-rendered-object managing area. Reference numerals 901, 902, 903, 904, 905, and 906 denote areas for managing last objects rendered in the first to sixth bands, respectively. Numbers stored in these areas are called last object numbers.

Next, a process of generating print data of a PDL format of one page, which is performed by the printer driver 1503, will be described with reference to the flowchart shown in FIG. 10.

Figure 10:
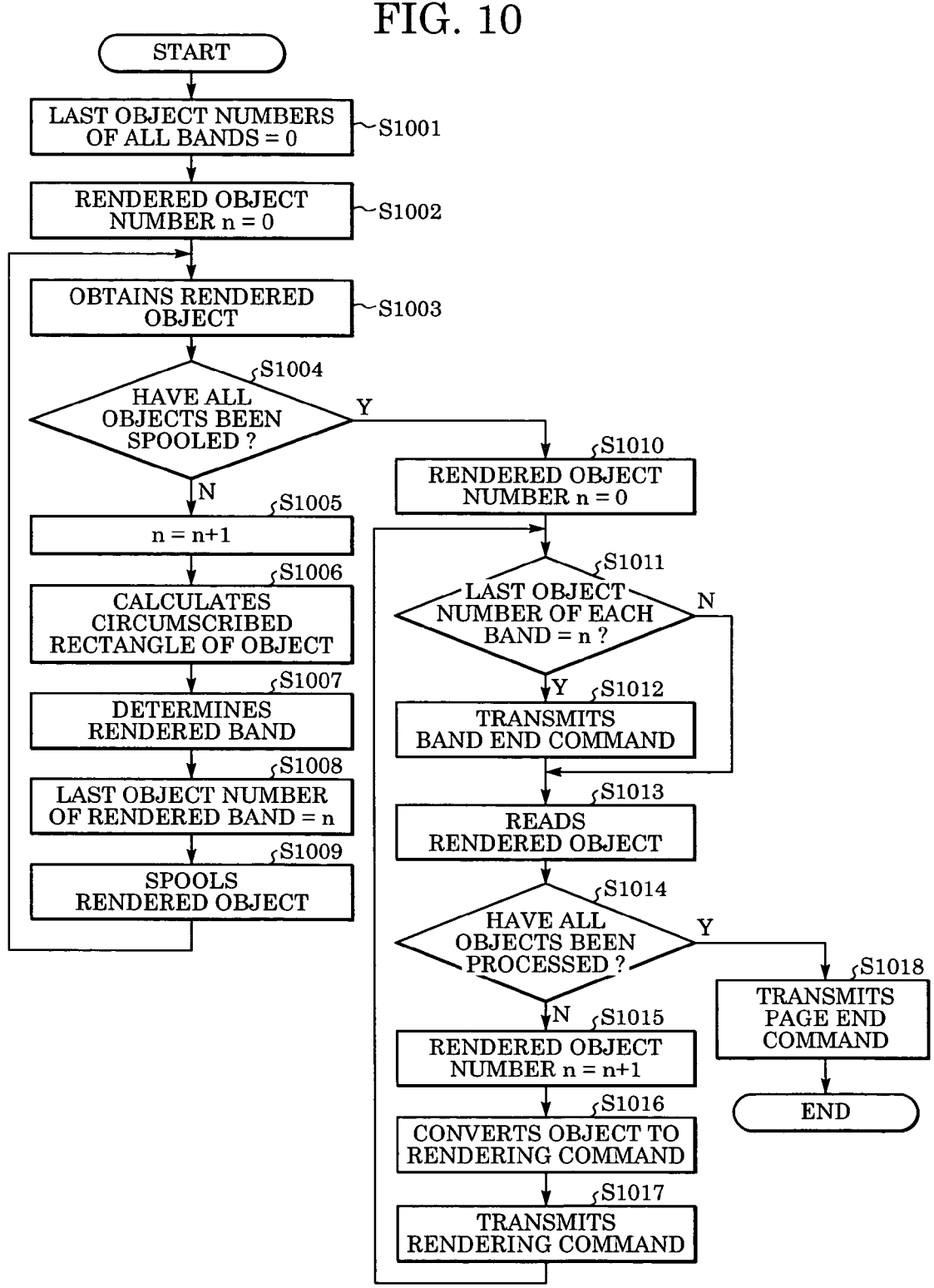
FIG. 10 is a flowchart showing an example of the data processing in the data processing apparatus according to the present invention.

FIG. 10 is a flowchart showing an example of data processing performed by the data processing apparatus according to the present invention. This processing is realized when the CPU 1401 of the controller unit, serving as hardware of the host computer 201, loads a control program corresponding to the printer driver 1503 stored in the external memory 1411, such as a hard disk, to the RAM 1402 and executes the control program. S1001 to S1018 denote steps of the data processing.

After processing of a page is started, the printer driver 1503 initializes (sets to "0") the last object numbers of all the bands in the last-rendered-object managing area 900 in step S1001. Herein, the value "0" represents a state where nothing is rendered.

Then, in step S1002, the printer driver 1503 sets a rendered object number n to "0". Herein, the rendered object number is a number which is assigned to each rendered object in one page from "1". The last rendered object of each band is specified by this number.

Then, in step S1003, the printer driver 1503 obtains a rendered object output from the application 1501 as upper software and temporarily stores the rendered object in the driver spooler 1505. Then, in step S1004, the printer driver 1503 determines whether all rendered objects have been spooled.

If all rendered objects have not yet been spooled, that is, if a rendered object has been obtained, 1 is added to the rendered object number n in step S1005. Then, in step S1006, the printer driver 1503, which recognizes band areas defined by dividing a page in accordance with the paper carried direction of the printer, calculates a rectangular area circumscribing the rendered object based on the position and size of the rendered object. The circumscribed rectangle may be supplied to the printer driver 1503 as information associated with the rendered object, depending on the rendering system of the host computer 201.

In a rendering system in which the circumscribed rectangle of the rendered object is not supplied to the printer driver 1503, the printer driver 1503 calculates the circumscribed rectangle based on the coordinates and the width of line of the rendered object.

Then, in step S1007, the printer driver 1503, which recognizes band areas defined by dividing a page in accordance with the paper carried direction of the printer, determines the band on which the rendered object is to be rendered based on the circumscribed rectangle of the rendered object. Then, in step S1008, the printer driver 1503 sets a rendered-object number to the last object number of the target band in the last-rendered-object managing area 900.

If the circumscribed rectangle of the rendered object lies across a plurality of bands, last object numbers of the areas 901 to 906 are updated.

Then, in step S1009, the printer driver 1503 writes the rendered object in a spool file of the driver spooler 1505 in a temporary storage area (RAM) so as to spool it. Then, the process returns to step S1003, where the printer driver 1503 obtains and processes the next rendered object.

If it is determined in step S1004 that all the rendered objects in one page have been spooled, the process proceeds to step S1010, where the rendered object number n is set to "0". Then, in step S1011, the last object number of each band in the last-rendered-object managing area 900 shown in FIG. 9 is compared with the rendered object number n in order to determine whether both numbers are equal to each other. If both numbers are different from each other, the process proceeds to step S1013. If both numbers are equal to each other, the process proceeds to step S1012, where a band end command (band end information) for the target band is transmitted to the printer controller 101 of the printer.

Then, the process proceeds to step S1013, where one of the rendered objects spooled in step S1009 is read from a file. Then, in step S1014, it is determined whether a rendered object could be read (whether all rendered-objects have been processed). If a rendered object could be read, that is, if an unprocessed rendered object exists, the process proceeds to step S1015, where 1 is added to the rendered object number n.

Then, in step S1016, the rendered object is converted to a rendering command of a PDL format which can be interpreted in the printer, and the rendering command is written in the system spooler 1504. Further, in step S1017, the rendering command written in the system spooler 1504 is transmitted to the printer controller 101 of the printer through the bidirectional interface or the LAN. Then, the process returns to step S1011.

If it is determined in step S1014 that all the rendered objects have been processed, the process proceeds to step S1018, where a page end command is transmitted to the printer controller 101 of the printer, so that processing of one page is completed. If rendering data of a plurality of pages is output from the application 1501, the process returns to step S1001.

In this embodiment, pieces of print data of a PDL format written in the system spooler 1504 are sequentially transmitted to the printer controller 101. However, the present invention is not limited to this method, but print data may be transmitted to the printer controller 101 after print data of one page has been written, or print data may be transmitted to the printer controller 101 after print data of all pages has been written in the system spooler 1504.

As described above, in this embodiment, the printer driver PD of the host computer 201 determines the band in which each rendered object is placed and spools rendered objects of one page. Then, the printer driver transmits a band end command after transmitting the last rendered object of each band to the printer controller 101 of the printer.

In this way, the printer driver converts a plurality of rendered objects generated by an application to rendering commands which can be interpreted by the printing apparatus in units of pages. A page is divided into a plurality of bands by the printing apparatus, and a rendered object that should be rendered last is detected from each band. Every time a rendered object that should be rendered last is detected from a band, the last rendered object is converted to a rendering command, and end information indicating the end of processing of the target band is added to a print job, which is transmitted to the printing apparatus. The rendered objects generated by an application are sequentially converted to rendering commands which can be interpreted by the printing apparatus in units of pages.

The printer controller 101 of the printer receives a band end command and allows the band to be rendered. Accordingly, start of printing of a first page can be hastened and also the timing of releasing intermediate data in the intermediate buffer 209 is hastened. Therefore, the intermediate buffer 209 is less likely to be cluttered and the throughput can be easily maintained.

In the printer driver PD, spooled rendered objects of one page may be processed in units of bands and rendering commands of each band may be transmitted to the printer controller 101. However, if the rendering commands are processed in units of bands, a rendering command which covers a plurality of bands is repeatedly transmitted, and thus a large area must be prepared for storing intermediate data in the printing apparatus. In contrast to this, in the above-described method, since rendering commands are transmitted in a PDL format or in units of pages, a rendering command is transmitted only once even if the command covers a plurality of bands. Further, after the printing apparatus has received a band end command, the specified band can be started to be rendered. Therefore, the printing throughput can be advantageously improved compared to a conventional printing apparatus of a PDL format.

According to the above-described embodiment, the printer driver PD manages the last rendered object of each band and transmits a band end command to the printer. The printer receives the band end command and allows the corresponding band to be rendered. Accordingly, start of printing of the first page is hastened and also the timing of releasing the intermediate data is hastened. Therefore, the intermediate buffer is less likely to be cluttered and the throughput can be easily maintained.

In a normal case, even if many rendered objects clutter the intermediate buffer so as to complicate a page, rendering is sequentially started from a band in which the intermediate data has been generated, and thus degradation of image quality due to lack of memory for the intermediate data is less likely to occur.

Second Embodiment

In the first embodiment, A4 paper in a portrait orientation is used as an example. However, A4 paper is usually used in a landscape orientation in a printer copying with up to A3 size. Whether A4 paper is used in a portrait or landscape orientation is determined depending on the model of the printer or the size of paper set in the paper cassette 102.

In a printer having a finishing function of stapling or punching a document after printing it, the position to be stapled or punched is determined according to the orientation of paper.

That is, the printing system according to the first embodiment is not suitable for a general printer driver because the printer driver has to recognize these conditions.

In order to solve this problem, a printing system according to a second embodiment will be described. In this printing system, the printer driver of the data processing apparatus need not recognize whether the printer selects a portrait or landscape orientation of paper. In this embodiment, too, the present invention is applied to an LBP as an engine system.

The internal configuration of the LBP and the control unit of the second embodiment is the same as that of the first embodiment, which has been described with reference to FIGS. 1 and 2. Therefore, the corresponding description will be omitted.

Figure 11:
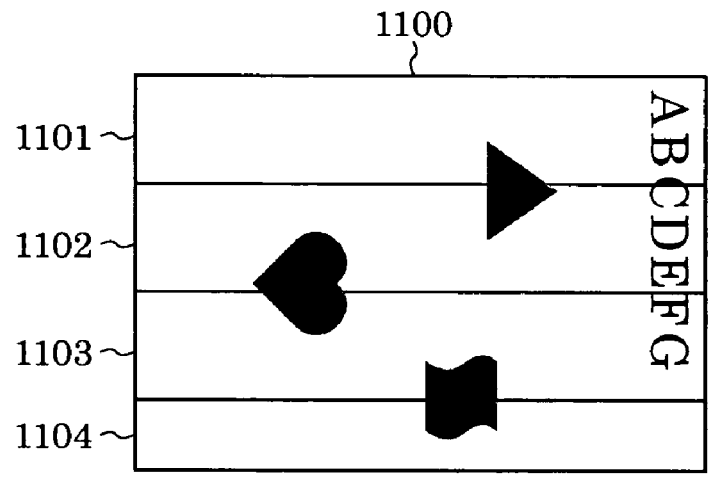
FIG. 11 is a schematic view illustrating a state where a page is divided into bands and printed by the printing unit shown in FIG. 2.

FIG. 11 is a schematic view illustrating a state where a page to be printed by the printing unit 215 is processed while being divided into bands. In this case, objects of characters and figures are laid out in a band or across a plurality of bands.

In FIG. 11, reference numeral 1100 denotes an A4 sheet of paper in a landscape orientation. In this embodiment, the A4 landscape sheet is processed while being divided into four bands 1101, 1102, 1103, and 1104.

The configuration of the intermediate buffer 209 shown in FIG. 2, generation of intermediate data, timing of starting rendering, and release of intermediate data are the same as in the first embodiment, and thus the corresponding description will be omitted.

Next, various types of command processing and a process of generating intermediate data of one page performed by the CPU 208 will be described. The process of generating intermediate data according to the second embodiment is the same as that of the first embodiment shown in the flowchart in FIG. 7, except step S711. The format of a band end command of this embodiment is sc <band>; <direction> BE. The difference from the first embodiment is that a second parameter <direction> is added.

<direction> indicates the direction of paper set to the printer driver PD. A value "0" indicates paper feed in a portrait direction and "1" indicates paper feed in a landscape direction.

In step S711 in FIG. 7, only when the direction specified by <direction> matches the direction of the current page, the state managing area of the band specified by <band> is set to "1" (intermediate data has been generated), and then the process returns to step S701.

On the other hand, when the direction specified by <direction> does not match the direction of the current page, the band end command becomes invalid.

The rendering process is the same as that described with reference to the flowchart shown in FIG. 8 in the first embodiment, and thus the corresponding description will be omitted.

Next, the processing of the printer driver PD, which is a program on the host computer 201 in the second embodiment, will be described. The printer driver PD has a unit for managing the object which is rendered last in each band.

Figure 12:
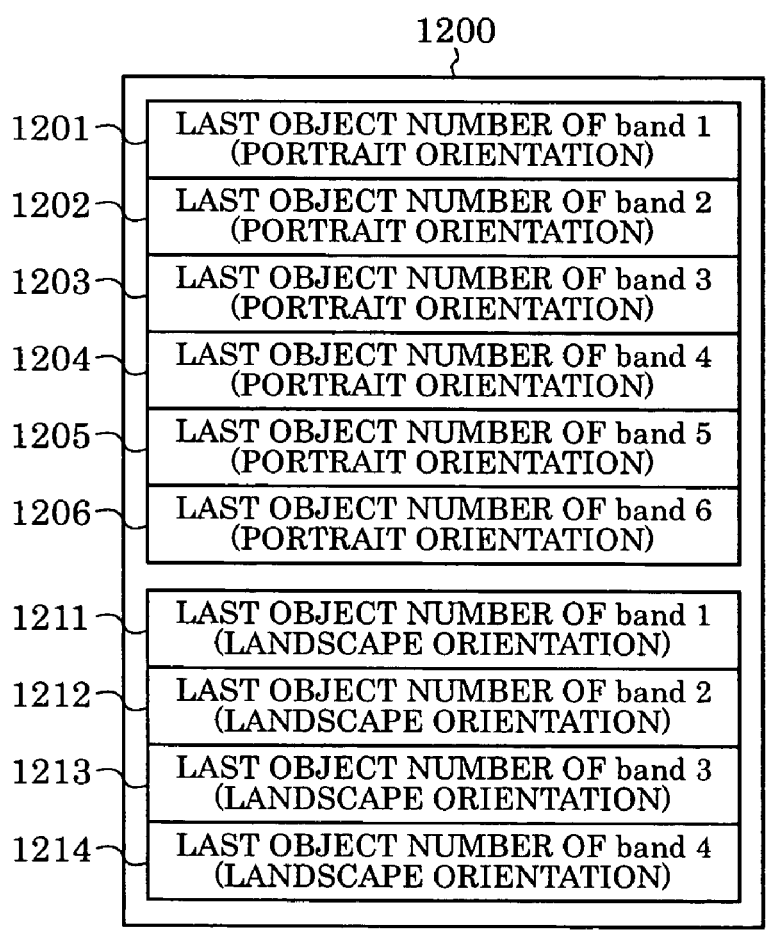
FIG. 12 illustrates a second memory area for managing objects by the data processing apparatus according to a second embodiment of the present invention.

FIG. 12 illustrates a second memory area for managing objects in the data processing apparatus according to the second embodiment of the present invention. The second memory area corresponds to a memory area for managing objects by the printer driver PD of the host computer 201 shown in FIG. 2. The difference from the memory area shown in FIG. 9 is that a memory area for managing a last rendered object in accordance with the paper feeding direction is allocated.

In FIG. 12, reference numeral 1200 denotes an area for storing information for managing a last object rendered in each band, which is called a last-rendered-object managing area. In this embodiment, the last rendered object of each band is managed for both cases where the printer selects a portrait orientation and a landscape orientation. Reference numerals 1201, 1202, 1203, 1204, 1205, and 1206 denote areas for managing last objects rendered in the first, second, third, fourth, fifth, and sixth bands, respectively, when the printer selects a portrait orientation.

Reference numerals 1211, 1212, 1213, and 1214 denote areas for managing last objects rendered in the first, second, third, and fourth bands, respectively, when the printer selects a landscape orientation.

The processing of one page by the printer driver PD of this embodiment is the same as that described with reference to the flowchart shown in FIG. 10 in the first embodiment. However, steps S1007, S1008, and S1012 are different.

In step S1007, the band in which an object is to be rendered is determined based on the circumscribed rectangle of the rendered object. In step S1008, a rendered object number is set to the last object number of the target band of the last-rendered-object managing area 1200. In this embodiment, these steps are performed on both bands of portrait and landscape orientations.

In step S1012, a band end command for the target band is transmitted to the printer. In this embodiment, the second parameter <direction> of the band end command is switched depending on whether the target band is a portrait-orientation band or a landscape-orientation band. If the target band is a portrait-orientation band, the value is set to "0". If the target band is a landscape-orientation band, the value is set to "1".

As described above, in this embodiment, when the printer driver PD of the host computer 201 determines the band in which each object is rendered, the printer driver PD makes a determination for both cases where the printer selects a portrait-oriented sheet and a landscape-oriented sheet. Also, the printer driver PD manages the last rendered object of each band in a portrait-oriented sheet and a landscape-oriented sheet and notifies the printer of end of band. Therefore, the same advantages as those in the first embodiment can be obtained in both cases where the printer selects a portrait orientation and a landscape orientation.

This means that the printer driver PD of the host computer need not recognize the model of a printer, the orientation of paper set in a paper cassette, finishing processes, and other conditions. This is favorable for developing a general printer driver PD.

Hereinafter, the configuration of a data processing program which can be read in the printing system, to which the data processing apparatus and the print control apparatus of the present invention can be applied, will be described with reference to the memory map shown in FIG. 13.

FIG. 13 illustrates a memory map of a storage medium for storing various data processing programs which can be read in the printing system, to which the data processing apparatus and the print control apparatus of the present invention can be applied.

Although not shown in the figure, information for managing programs stored in the storage medium, such as version information and a creator, may be stored. Also, information depending on the OS of a program reader, such as icons for discriminating programs, may be stored.

Further, data depending on the various programs is managed by the directory. Also, a program for installing the various programs to a computer and a program for decompressing a compressed program may be stored.

The functions shown in FIGS. 7, 8, and 10 of this embodiment may be executed by a host computer according to an externally-installed program. In that case, a group of information including programs may be supplied to an output apparatus from an external storage medium through a storage medium such as a CD-ROM, a flash memory, or an FD, or through a network.

As described above, the present invention is achieved by supplying a storage medium containing program code of software for realizing the function of the above-described embodiments to a system or an apparatus, so that the computer (or CPU or MPU (micro-processing unit)) of the system or the apparatus reads the program code stored in the storage medium and executes it.

In that case, the program code read from the storage medium realizes a new function of the present invention.

Any form of program may be used if the program has a function of program. For example, object code, a program executed by an interpreter, and script data supplied to an OS may be used.

Examples of a storage medium for supplying the program include a flexible disk, a hard disk, an optical disk, a magneto-optical (MO) disk, a CD-ROM (compact disk-ROM), a CD-R (CD-recordable), a CD-RW (CD-rewritable), a magnetic tape, a nonvolatile memory card, a ROM, and a DVD (digital versatile disk).

In this case, the program code read from the storage medium realizes the function of the above-described embodiments.

Alternatively, the program may be supplied by accessing a site of the Internet by using a browser of a client computer and by downloading the computer program of the present invention or a compressed file including an automatically installed function from the site to a recording medium, such as a hard disk. Also, the program code constituting the program of the present invention may be divided into a plurality of files and the files may be downloaded from different sites. That is, a WWW (world wide web) server, an ftp (file transfer protocol) server, and the like, which allow a plurality of users to download the program files for realizing the function of the present invention in a computer, are included in the scope of the present invention.

Alternatively, the program of the present invention may be encoded, stored in storage media such as CD-ROMs, and distributed to users. Users who satisfy a predetermined condition are allowed to download key information for decoding the program from a site through the Internet, execute the encoded program by using the key information, and install the program in the computer to execute it.

The functions of the above-described embodiments may be realized by executing the program code read by a computer. Alternatively, the functions of the above-described embodiments may be realized when the OS operating in the computer executes part or whole of actual processing according to the instructions of the program code.

Further, the program code read from a storage medium may be written in a memory of an expansion board inserted into a computer or an expansion unit connected to a computer. A CPU or the like provided in the expansion board or the expansion unit may execute part or whole of actual processing according to the instructions of the program code, thus realizing the functions of the above-described embodiments.

While the present invention has been described with reference to exemplary embodiments, it is to be understood by those skilled in the art that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-104377 filed Mar. 31, 2004, and Japanese Patent Application No. 2005-008592 filed Jan. 17, 2005, which are hereby incorporated by reference herein.

What is claimed is:

1. A printing system comprising:
    a host computer;
    a printer controller; and
    a printer engine,
    wherein the host computer comprises:
    a spool unit configured to obtain a rendered object, determine a band where the obtained rendered object is rendered, update specifying information for specifying a last object of the determined band, and spool the rendered object;
    a determination unit configured to determine whether each rendered object is the last object of the band based on the specifying information when a spool by the spool unit of all of the rendered object is completed; and
    a transmission unit configured to transmit a band end command and a per-page rendering command converted from the rendered object to the printer controller when the determination unit determines the rendered object to be the last object of the band, and to transmit the per-page rendering command converted from the rendered object to the printer controller when the determination unit determines the rendered object not to be the last object of the band, and
    wherein the printer controller comprises:
    a storing unit configured to determine, when the per-page rendering command is received from the host computer, to which band the received per-page rendering command is intended, and to store intermediate data converted from the received per-page rendering command to an intermediate buffer for the band determined to be intended by the received per-page rendering command;
    a transition unit configured to transition, when the band end command is received from the host computer, the band, to which the received band end command is intended, into a rendering-standby state; and
    a rendering unit configured to poll a state of the intermediate buffer, to determine whether there is the band in the rendering-standby state, and to render an image based on intermediate data of the band the band determined to be in the rendering-standby state, and
    wherein the printer engine comprises a printing unit configured to print the image rendered by the rendering unit.

2. The printing system according to claim 1,
    wherein the specifying information includes information for a landscape orientation paper and information for a portrait orientation paper,
    wherein the spool unit obtains the rendering object, determines a band for a landscape orientation paper where the obtained rendered object is rendered, and updates specifying information for specifying a last object for the band for the landscape orientation paper where the obtained rendered object is rendered, and determines a band for a portrait orientation paper where the obtained rendered object is rendered and updates specifying information for specifying a last object for the band for the portrait orientation paper where the obtained rendered object is rendered, and spool the rendered object, and
    wherein the band end command includes a parameter to specify a landscape orientation paper or a portrait orientation paper.

3. A printing method executed by a printing system including a host computer with a spool unit, a determination unit, and a transmission unit, a printer controller with a storing unit, a transition unit, and a rendering unit, and a printer engine with a printing unit, the method comprising:
    obtaining a rendered object, by the spool unit, and determining a band where the obtained rendered object is rendered, updating specifying information for specifying a last object of the determined band, and spooling the rendered object;

determining, by the determining unit, whether each of the rendered object is the last object of the band based on the specifying information when the spool by the spool unit of all of the rendered object is completed;

transmitting, by the transmission unit, a band end command and a per-page rendering command converted from the rendered object to the printer controller when the determination unit determines the rendered object to be the last object of the band, and the per-page rendering command converted from the rendered object to the printer controller when the determination unit determines the rendered object not to be the last object of the band;

determining, by the storing unit, when the per-page rendering command is received from the host computer, to which band the received per-page rendering command is intended, and to store intermediate data converted from the received per-page rendering command to an intermediate buffer for the band determined to be intended by the received per-page rendering command;

transitioning, by the transition unit, when the band end command is received from the host computer, the band, to which the received band end command is intended, into a rendering-standby state;

polling a state of the intermediate buffer, by the rendering unit, to determine whether there is the band in the rendering-standby state, and to render an image based on intermediate data of the band the band determined to be in the rendering-standby state, and printing, by the printing unit, the image rendered by the rendering unit.

4. The printing method according to claim 3, wherein the specifying information includes information for a landscape orientation paper and information for a portrait orientation paper, wherein the spool unit obtains the rendering object, determines a band for a landscape orientation paper where the obtained rendered object is rendered, and updates specifying information for specifying a last object for the band for the landscape orientation paper where the obtained rendered object is rendered, and determines a band for a portrait orientation paper where the obtained rendered object is rendered and updates specifying information for specifying a last object for the band for the portrait orientation paper where the obtained rendered object is rendered, and spool the rendered object, and wherein the band end command includes a parameter to specify a landscape orientation paper or a portrait orientation paper.

* * * * *